(12) United States Patent
Schuetz et al.

(10) Patent No.: US 11,897,633 B2
(45) Date of Patent: Feb. 13, 2024

(54) SYSTEM AND METHOD FOR PROVIDING MAINTENANCE AND REPAIR UNITS FOR MAINTENANCE WORK ON AIRCRAFT

(71) Applicants: HUBTEX MASCHINENBAU GMBH & CO. KG, Fulda (DE); DIMOS MASCHINENBAU GMBH, Petersberg (DE)

(72) Inventors: Alfred Schuetz, Fulda (DE); Pascal Schuetz, Fulda (DE); Juergen Keller, Grossenlueder (DE)

(73) Assignees: HUBTEX MASCHINENBAU GMBH & CO. KG, Fulda (DE); DIMOS MASCHINENBAU GMBH, Petersberg (DE)

( * ) Notice: Subject to any disclaimer, the term of this patent is extended or adjusted under 35 U.S.C. 154(b) by 16 days.

(21) Appl. No.: 17/620,749

(22) PCT Filed: May 26, 2020

(86) PCT No.: PCT/EP2020/064560
§ 371 (c)(1),
(2) Date: Dec. 20, 2021

(87) PCT Pub. No.: WO2020/254074
PCT Pub. Date: Dec. 24, 2020

(65) Prior Publication Data
US 2022/0411106 A1    Dec. 29, 2022

(30) Foreign Application Priority Data

Jun. 21, 2019    (DE) .................... 10 2019 116 807.4

(51) Int. Cl.
*B64F 5/40* (2017.01)
*B64F 5/50* (2017.01)
(Continued)

(52) U.S. Cl.
CPC .................. *B64F 5/40* (2017.01); *B60P 3/14* (2013.01); *B64F 5/50* (2017.01); *B66F 9/07563* (2013.01)

(58) Field of Classification Search
CPC ..... B60B 29/00; B60B 30/10; B66F 9/07563; B60P 3/14; B64F 5/40; B64F 5/50
See application file for complete search history.

(56) References Cited

U.S. PATENT DOCUMENTS 2,326,684 A * 8/1943 Ross .......................... B64F 1/22
414/427
2,444,992 A * 7/1948 Kittel .................... B60B 29/002
414/427
(Continued)

FOREIGN PATENT DOCUMENTS

JP    H01-237230 A    9/1989
JP    2002-154792 A    5/2002
(Continued)

*Primary Examiner* — Jason L Vaughan
(74) *Attorney, Agent, or Firm* — Norman B. Thot

(57) ABSTRACT

A system for providing maintenance and repair units for maintenance work on an aircraft includes a maintenance and repair unit having a frame structure which carries equipment and which is transportable, and a transport vehicle having a lifting device which can raise, set down, and transport the maintenance and repair unit.

16 Claims, 6 Drawing Sheets

(51) Int. Cl.
*B60P 3/14* (2006.01)
*B66F 9/075* (2006.01)

(56) References Cited

U.S. PATENT DOCUMENTS

| | | | | |
|---|---|---|---|---|
| 3,301,419 A | * | 1/1967 | Molden | B60B 29/002 414/428 |
| 3,570,503 A | | 3/1971 | DeBoliac | |
| 3,633,970 A | * | 1/1972 | Langhals | B60P 3/14 296/24.32 |
| 3,858,735 A | * | 1/1975 | Zrostlik | B60P 3/14 414/427 |
| 4,266,795 A | * | 5/1981 | Walker | B66F 9/07563 280/495 |
| 4,801,237 A | | 1/1989 | Yamamoto | |
| 5,415,516 A | * | 5/1995 | Richards | B60P 1/025 187/244 |
| 5,467,827 A | * | 11/1995 | McLoughlin | A62C 27/00 414/535 |
| 6,547,506 B1 | * | 4/2003 | Jacob | B60P 1/5433 414/498 |
| 7,200,913 B2 | * | 4/2007 | Laird | B60B 29/002 414/428 |
| 8,137,051 B2 | * | 3/2012 | Glenn | B60P 3/16 166/243 |
| 8,956,100 B2 | * | 2/2015 | Davi | B60P 3/14 414/334 |
| 2006/0263185 A1 | * | 11/2006 | Glenn | B60P 3/16 414/498 |
| 2007/0253801 A1 | | 11/2007 | Van Weezel et al. | |
| 2010/0044369 A1 | * | 2/2010 | Toepfer | E04H 1/1277 220/1.5 |
| 2011/0316299 A1 | | 12/2011 | Mccoubrey | |
| 2015/0166198 A1 | | 6/2015 | IIokanson et al. | |
| 2019/0084680 A1 | | 3/2019 | Grossman | |

FOREIGN PATENT DOCUMENTS

| | | | |
|---|---|---|---|
| WO | WO 2010/000018 A1 | 1/2010 | |
| WO | WO-2015042658 A1 * | 4/2015 | B60B 29/001 |

* cited by examiner

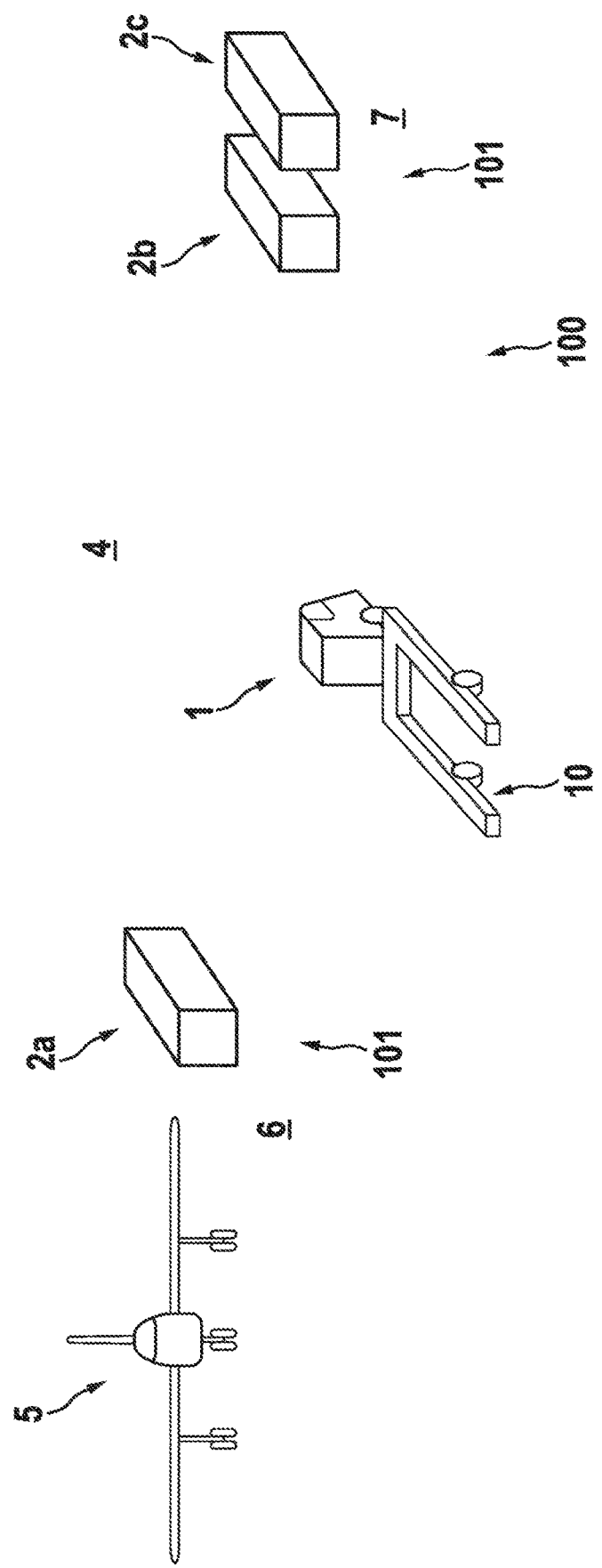

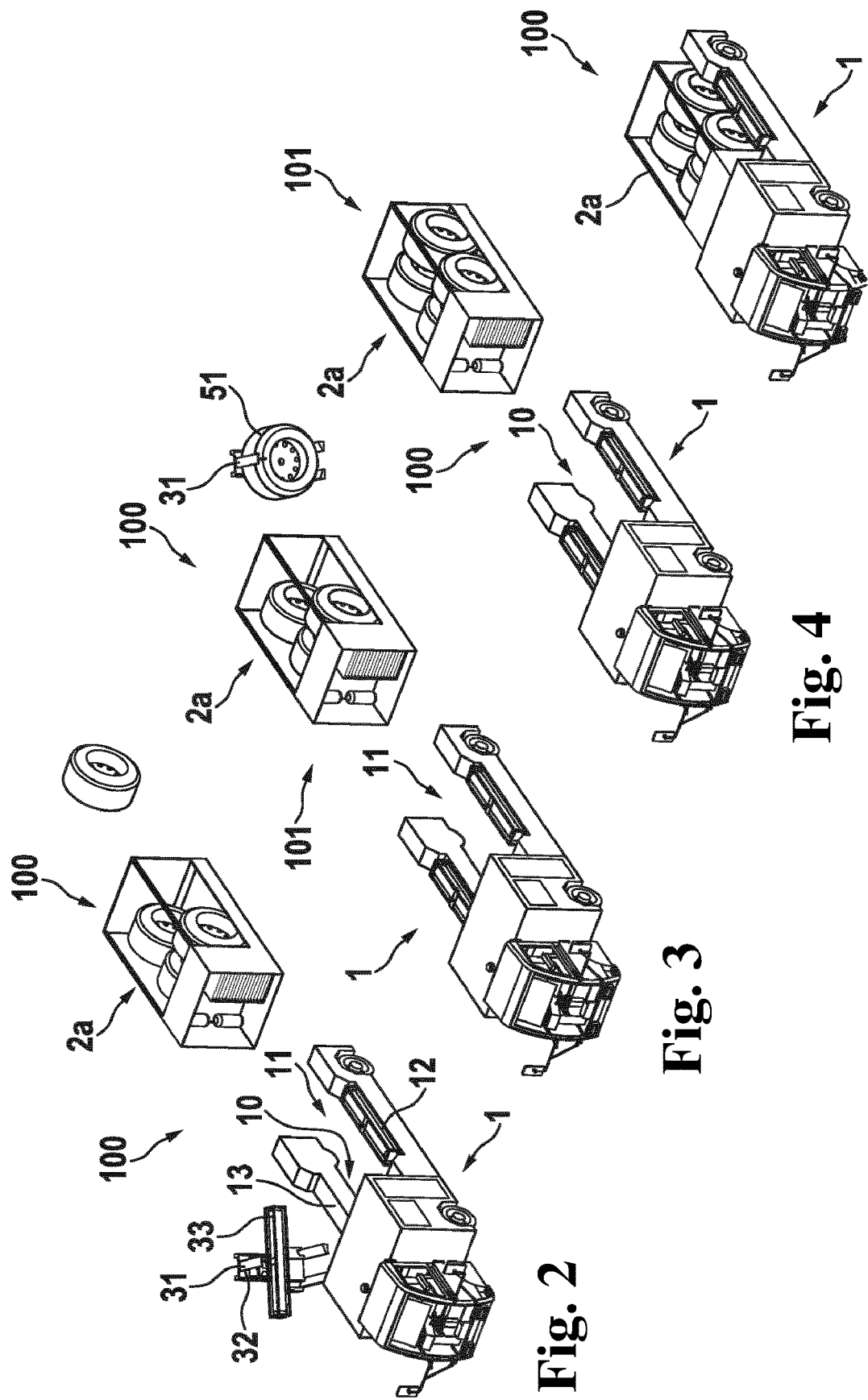

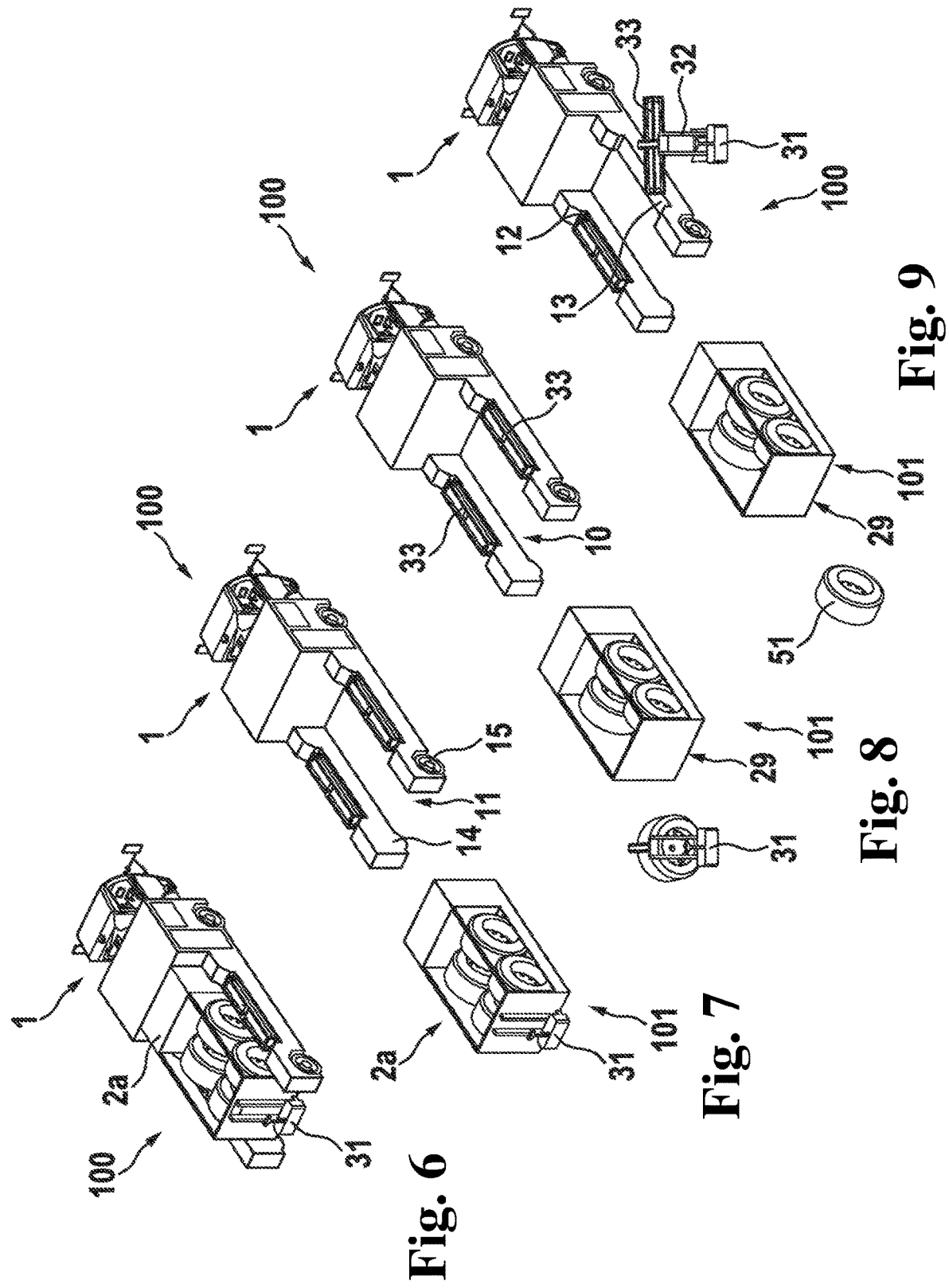

SYSTEM AND METHOD FOR PROVIDING MAINTENANCE AND REPAIR UNITS FOR MAINTENANCE WORK ON AIRCRAFT

CROSS REFERENCE TO PRIOR APPLICATIONS

This application is a U.S. National Phase application under 35 U.S.C. § 371 of International Application No. PCT/EP2020/064560, filed on May 26, 2020 and which claims benefit to German Patent Application No. 10 2019 116 807.4, filed on Jun. 21, 2019. The International Application was published in German on Dec. 24, 2020 as WO 2020/254074 A1 under PCT Article 21(2).

FIELD

The present invention relates to a system for providing maintenance and repair units for maintenance work on aircraft, in particular for replacing wheels on the landing gear of aircraft. The present invention also relates to a method for providing maintenance and repair units for maintenance work on aircraft.

BACKGROUND

Maintenance and repair work on aircraft is usually carried out at an airport in what is referred to as a hangar. However, in order to prevent a delay, it is not uncommon for minor repairs, maintenance or repair work to also be carried out outside such hangars, in particular on the airport apron, such as in an outside position or in a parking position where the aircraft can be connected to a passenger boarding bridge.

The maintenance and repair work that occurs most frequently on aircraft, due to wear and tear, is the changing of individual or all aircraft wheels on the nose landing gear and/or main landing gear of an aircraft. Changing the entire aircraft wheel, i.e., the tire together with the rim, has proven successful in this case, in particular due to the time savings.

Various systems and methods have been developed in order to be able to provide equipment, such as tools, aids, operating resources, spare parts such as spare wheels and the like, which are required for maintenance and repair work at the previously mentioned parking positions on an airport apron.

Systems have previously been described in which aircraft mechanics drive a workshop vehicle to a relevant aircraft in a parking position for maintenance and repair work, and the workshop vehicle remains in the vicinity of the work site for the duration of the maintenance and repair work on the aircraft. The workshop vehicle can in this case be loaded with the required equipment. The workshop vehicle can also be equipped with a lifting crane, for the use of which the vehicle is usually jacked up on extendable stilts for improved stability. The disadvantage of such vehicles is, however, that such workshop vehicles, due to their nature as motorized vehicles, are relatively cost-intensive both to purchase and to maintain in operation, in particular as a result of required permissions, operating permits to be renewed, repair or maintenance work and/or operating resources. This can result in considerable costs, in particular at larger airports where more than one aircraft is often to be processed at the same time and therefore more than one workshop vehicle is required.

As an alternative to motorized workshop vehicles, simple trailers loaded with equipment are now increasingly being used as "mobile workshops." Such trailers are primarily used to provide the equipment. An aid such as a lifting crane cannot, however, usually be provided with such trailers. This means that all of the equipment must be manually unloaded from the trailer or loaded onto the trailer. When replacing a wheel, for example, this means that an aircraft wheel which weighs approximately 150 kg must be loaded onto the trailer by hand, which requires an enormous amount of force even with a low loading height. The improvement developed from this problem in the prior art, i.e., providing a loading ramp to make it possible to move the wheels by rolling during loading and unloading, leads to an increased risk of accidents, however, in particular due to tripping over the ramp and/or the wheel slipping laterally and falling down. The load of such a workshop trailer is also limited so that usually only two to four spare wheels can be carried.

Another problem, in particular at airports, is the limited space next to and below an aircraft. The vehicles used in this region should not exceed a certain size in order to prevent collisions. This can be particularly problematic in the case of standard vehicles or standard trailers.

SUMMARY

An aspect of the present invention is to provide a system and method which improve at least one of the above-mentioned disadvantages and which in particular allow a maintenance and repair unit for maintenance work on aircraft to be provided in a cost-effective and reliable manner.

In an embodiment, the present invention provides a system for providing maintenance and repair units for maintenance work on an aircraft which includes at least one maintenance and repair unit which comprises at least one frame structure which is configured to carry equipment and to be transportable, and at least one transport vehicle which comprises a lifting device which is configured to raise, to set down, and to transport the at least one maintenance and repair unit. Advantageous embodiments and developments of the present invention are disclosed in the dependent claims, the description, and the drawings.

BRIEF DESCRIPTION OF THE DRAWINGS

The present invention is described in greater detail below on the basis of embodiments and of the drawings in which:

FIG. 1 shows an embodiment of a system according to the present invention;

FIG. 2 shows the system in a first state in a first perspective view;

FIG. 3 shows the system in a second state in a first perspective view;

FIG. 4 shows the system in a third state in a first perspective view;

FIG. 5 shows the system in a fourth state in a first perspective view;

FIG. 6 shows the system in a first state in a second perspective view;

FIG. 7 shows the system in a second state in a second perspective view;

FIG. 8 shows the system in a third state in a second perspective view;

FIG. 9 shows the system in a fourth state in a second perspective view;

DETAILED DESCRIPTION

Figure 10:
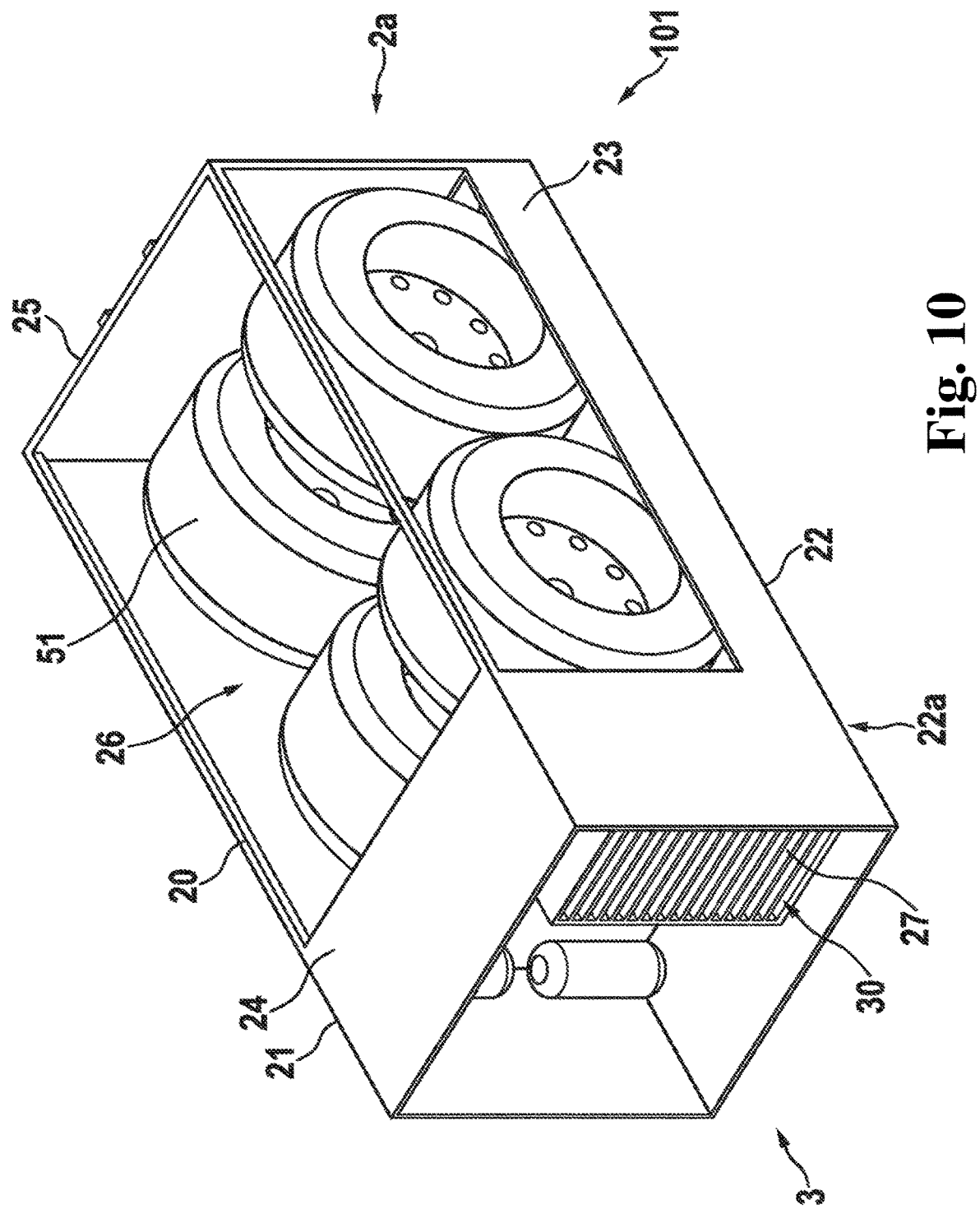
FIG. 10 shows a maintenance and repair unit of the system in a first perspective view.

According to the present invention, the system for providing maintenance and repair units for, in particular decentralized, maintenance work on aircraft, in particular for replacing aircraft wheels, comprises at least one maintenance and repair unit which has at least one frame structure which is in particular separately and rigidly constructed and which is suitable for carrying equipment and which is transportable as such, and at least one transport vehicle having a lifting device for raising, setting down and transporting the maintenance and repair unit. The frame structure can consequently be received by the transport vehicle for transport or set down on the ground at a relevant location, for example, in the manner of a swap body container. This makes it possible for a maintenance and repair unit equipped with equipment to be brought to a place of use by a transport vehicle and parked there for the duration of work on the aircraft, while the then-empty transport vehicle can transport other maintenance and repair units to a different relevant place of use or back to a base, such as an equipment store, in which the maintenance and repair units are equipped for use. Only one motorized vehicle is therefore required, in particular at larger airports. A frame structure which can be placed on or which rests directly on the floor of the apron also allows a minimal step height between the maintenance and repair unit and the apron floor, so that the effort required for loading and unloading and the risk of accidents are significantly reduced. An additional ramp is in particular not required. It should be clear that, in the present case, the maintenance and repair unit is to be understood to be the totality of the devices remaining at the aircraft for the maintenance, in particular the frame structure which can be equipped with the equipment and optionally further aids.

The frame structure can, for example, not have its own wheels for moving or rolling the frame structure, i.e., it is wheel-less. The frame structure can therefore stand on the floor of the apron in a direct and stable manner so that, for example, extendable supports are not required to increase the stability of the maintenance and repair unit. As already mentioned above, the equipment can in particular include tools such as wrenches, aids such as a lifting crane, operating resources such as hydraulic oil, spare parts such as aircraft wheels, and the like. Equipment in the present case in particular includes all devices which are required for replacing an aircraft wheel.

The frame structure can, for example, be designed as an at least partially closed container having a bottom, lateral walls, a ceiling and/or at least one door. The equipment located in the container can therefore be protected particularly effectively against environmental influences. The frame structure can be designed, for example, as a walk-in service or maintenance container so that the equipment can be loaded into or out of the container in a particularly convenient manner. An organization system such as a shelf or cabinet for storing the equipment can, for example, be arranged in the container. A large amount of equipment can therefore be temporarily stored in a relatively small space.

In a ready state, a lower face of the frame structure can, for example, rest on a floor, in particular on the airport apron floor. The ready state is in particular the state in which the frame structure is not raised by the transport vehicle. The ready state is in particular always present when the frame structure is placed on a floor. Due to the particularly low step height between a bottom of the frame structure and the floor, equipment can be transported into or out of the frame structure in a particularly reliable and comfortable manner.

As already mentioned above, an organization system can be provided within the frame structure. A storage space for at least one aircraft wheel and at least one equipment chamber for storing equipment can in particular be provided. A fixing device for at least temporarily fixing the aircraft wheel in the holding position can be arranged at at least one storage space. Such a fixing device can, for example, be a curvature which is arranged on the bottom of the frame structure and which is designed to correspond to the curvature of the aircraft wheel, in particular in the form of a wheel chock. A receptacle in the form of a wheel suspension for fixing the aircraft wheel can furthermore alternatively or additionally be arranged at the holding position as a fixing device. The aircraft wheel located within the frame structure can as a result be transported in a particularly reliable manner. The equipment chamber can, for example, be designed as a shelf or cabinet. At least one shelf compartment or cabinet compartment is in this case, for example, designed to correspond to the size of equipment which can be stored therein.

In an embodiment of the present invention, the frame structure can, for example, have an external dimension having a width of approximately 180 cm, a length of approximately 250 cm, and a height of approximately 200 cm. The frame structure can as a result be designed to be particularly suitable for being received by a receiving region of a transport vehicle having a lifting device for raising, setting down, and transporting.

The maintenance and repair unit can comprise a mobile lift truck which is in particular formed separately and which is suitable for transporting aircraft wheels. The lift truck can be designed, for example, as a conventional manual lift truck. The lift truck can, for example, be motor-driven, but can in principle also be designed as a non-motor-driven truck. The lift truck advantageously has at least two lifting forks, in the region of which a fixing device can, for example, be arranged for at least temporarily fixing an aircraft wheel to the lift truck. The lift truck can also have a lifting device for raising or lowering a load located on the lift truck, such as an aircraft wheel. The lift truck can, for example, have a lifting mast for this purpose. This means that the load can also be raised or lowered over greater heights.

A fastening device can, for example, be provided on a lateral wall of the frame structure, to which fastening device the lift truck can at least temporarily be fastened. The fastening device can, for example, comprise two receiving shafts corresponding to the forks of the lift truck, into each of which a fork of the lift truck can be inserted, and the lift truck can be fixed within the receiving shafts by bracing the forks. This allows the lift truck to be attached to the frame structure in a particularly convenient manner, in particular for transporting the maintenance and repair unit. It is in this case particularly advantageous that the lift truck can be inserted into the receiving shafts of the fastening device, for example, from the outside or from the surroundings of the frame structure, so that when maintenance work begins, the lift truck can be removed as a first of the maintenance and repair unit and, when the work ends, it can be fastened to the frame structure again as the last. This is particularly advantageous for the maintenance work process.

In an embodiment of the present invention, a carrying arm which is suitable for raising and moving an aircraft wheel can, for example, be arranged on the frame structure. The carrying arm can in particular be mounted so as to be pivotable with respect to the frame structure. The carrying arm can be designed to be extendable in the longitudinal extension thereof, for example, telescopically or via an arm part which can also be pivoted out. The carrying arm can as a result be used in the vicinity of the frame structure or used as an aid. A device for at least temporarily fixing an aircraft wheel to the carrying arm is advantageously arranged at the free end of the carrying arm. The carrying arm can as a result be used, for example, to move an aircraft wheel removed from a landing gear to the frame structure and/or to move a replacement wheel from the frame structure to the landing gear of the aircraft, so that the movement or displacement of the wheel is made possible in a particularly reliable and convenient manner. In particular, no force needs to be exerted by a person. The carrying arm can furthermore be motor-driven and controllable by a drive and/or control unit which is optionally additionally arranged on the frame structure. The carrying arm can be arranged on an outer face of the frame structure; the arm can, for example, be arranged within the frame structure. The carrying arm can, for example, be at least partially surrounded by walls or a ceiling of the frame structure so that the carrying arm, at least in a retracted state, can be protected from environmental influences such as rainwater.

The transport vehicle can, for example, be designed as a low-floor lifting vehicle in which the load, in particular the maintenance and repair unit or the frame structure, is arranged between a first load wheel and a second load wheel and can be raised substantially horizontally via the lifting device. The load can in particular be arranged axially between the left-hand load wheel and the right-hand load wheel of the vehicle in the main direction of travel of the vehicle. The transport vehicle can thus in particular receive the frame structure between two separate, spaced apart, longitudinal members which protrude in the longitudinal extension of the vehicle, each of which have a free end, in particular for raising, lowering and transporting. The advantage of such a vehicle is in particular that the load, in this case the maintenance and repair unit, can be raised, lowered and transported in an almost permanently horizontal position. The equipment located within the frame structure can thereby in particular be prevented from slipping. The time required to receive or set down the frame structure is also particularly low. For an improved overview, a front window of a driver's cab of the transport vehicle can be arranged from a ceiling which forms the upper end of the driver's cab to a floor which forms the lower end of the driver's cab. This allows a driver of the transport vehicle to have a particularly large field of vision.

The transport vehicle can, for example, have at least one additional loading area on which at least one compressed air tank can be transported. The loading area can in particular be designed so that the compressed air tank can be transported thereon in a horizontal orientation of the compressed air tank cylinder. A compressed air tank commonly used for maintenance work on aircraft can be used as a result. A fastening device for at least temporarily fastening a compressed air tank to the loading area can, for example, also be arranged on the additional loading area. The fastening device can in particular be designed in the form of a corresponding recess into which the compressed air tank or a support structure of the compressed air tank, such as a frame structure, can be inserted, or in the form of a retaining bracket which is suitable for fixing the support structure of the compressed air cylinder, or the like. The compressed air tank is used, for example, during maintenance work to raise an aircraft, in particular the nose landing gear or one of the main landing gears, via a pneumatic hoist.

The method according to the present invention for providing maintenance and repair units for maintenance work on aircraft, in particular for replacing aircraft wheels, using the system as set forth above, provides the following steps: equipping at least one maintenance and repair unit with equipment in a central equipment store, in particular on an airport site, receiving a first maintenance and repair unit via a transport vehicle, in particular by raising the first maintenance and repair unit via the lifting device, transporting the first maintenance and repair unit from the equipment store to a first aircraft, and setting down the first maintenance and repair unit from the transport vehicle, in particular in the region next to and/or below the first aircraft. The equipping with equipment can take place, for example, centrally in a spare parts store or a workshop; in particular, a plurality of maintenance and repair units can be equipped at the same time. It should be clear that equipping is to be understood to be loading the maintenance and repair unit with equipment. A maintenance and repair unit can as a result be provided for maintenance work relatively quickly and without great expenditure of time. The transport vehicle can at the same time be used for other purposes, for example, to transport a maintenance and repair unit to or from an aircraft, while the maintenance and repair units are being equipped.

After the first maintenance and repair unit has been set down from the transport vehicle, a second maintenance and repair unit can, for example, be received, the second maintenance and repair unit can be transported from the equipment store to a second aircraft and the second maintenance and repair unit can be set down in the region of the second aircraft.

After the first or second maintenance and repair unit has been set down, a carrying arm arranged on the frame structure can, for example, be moved so that, during a replacement of an aircraft wheel, an aircraft wheel which is removed from a landing gear or a wheel suspension of an aircraft is moved via the carrying arm in the direction of the maintenance and repair unit, and an aircraft wheel is optionally moved from the maintenance and repair unit to the landing gear of the aircraft.

An embodiment of the present invention is explained in greater detail below under reference to the drawings. Like reference signs thereby denote like components.

In FIG. 1 shows by way of example the system 100 for providing maintenance and repair units 2a, 2b, 2c for maintenance work on an aircraft 5, which is located on an apron 6 (which is not shown in greater detail) of an airport 4 (which is also not shown in greater detail). The maintenance work here relates in particular to replacing or changing aircraft wheels 51.

In the present example, the system 100 comprises a total of three separate maintenance and repair units which are independent of one another and which are denoted by the reference signs 2a, 2b, 2c, as well as a transport vehicle 1 having a lifting device 10 for raising, setting down, and transporting the maintenance and repair unit 2a, 2b, 2c. The maintenance and repair unit 2a is here shown in a ready state 101 on the aircraft 5, and the maintenance and repair units 2b and 2c are here shown in a ready state 101 in an equipment store or a workshop 7 (which is not shown in greater detail). In the equipment store 7, the maintenance and repair units 2b, 2c are equipped with equipment 3 for subsequent use.

Each maintenance and repair unit 2a, 2b, 2c in principle has the same structure; the following description which relates to only one maintenance and repair unit therefore also analogously applies to the respective other maintenance and repair units.

Figure 11:
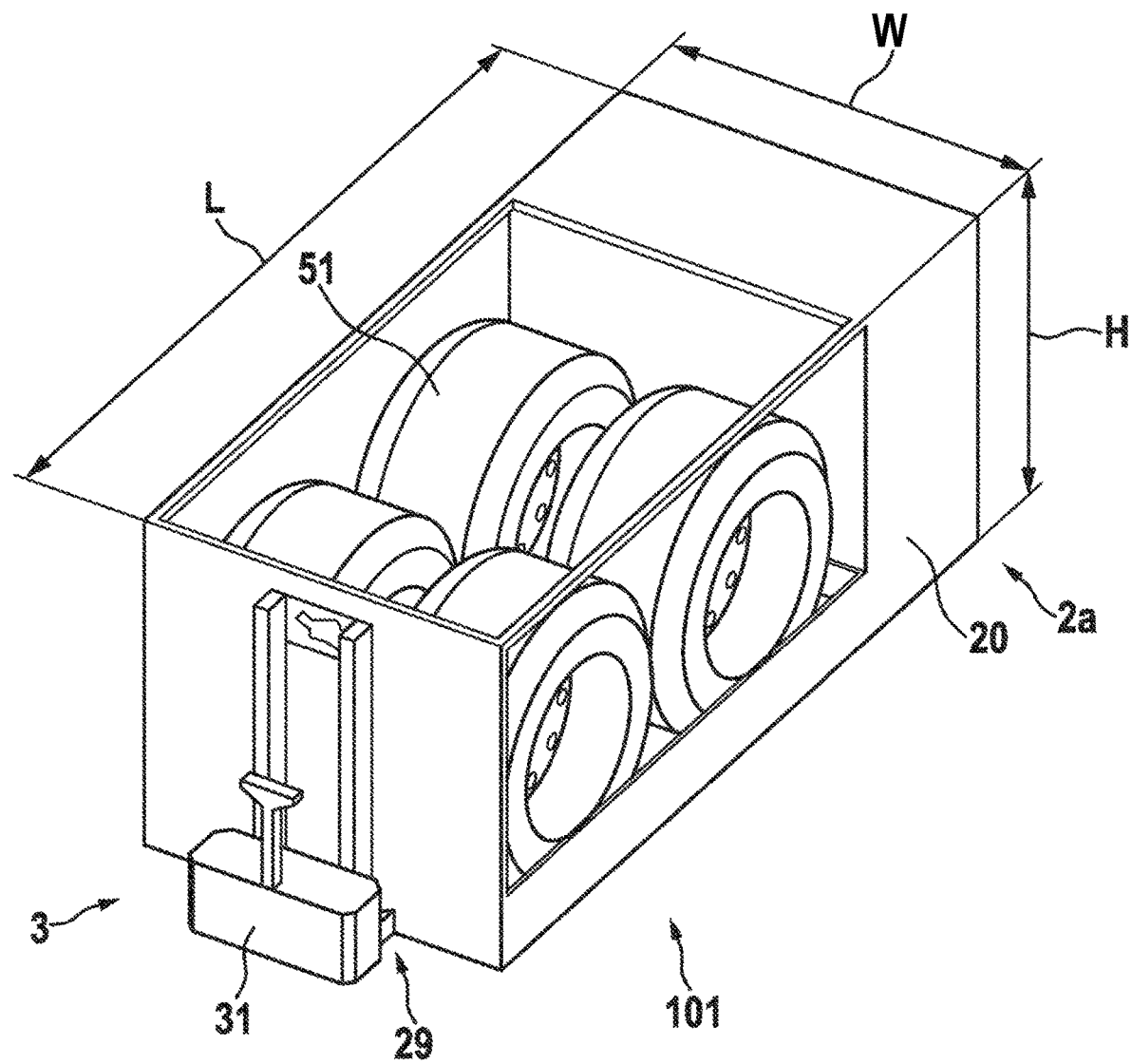
FIG. 11 shows a maintenance and repair unit of the system in a second perspective view.

The maintenance and repair units 2a, 2b, 2c are each designed as a compact unit and, as can be seen in particular in FIGS. 10 and 11, each have a frame structure 20 which is suitable for carrying equipment 3 and which is transportable.

In the present case, the frame structure 20 is constructed as a container 21 having a bottom 22, lateral walls 23, a ceiling 24, and a door 25. In a ready state 101, as shown, for example, in FIG. 1, the container 21 stands with a lower face 22a of the bottom 22 on a surrounding subfloor 6, in this case on the apron of the airport 4. The frame structure 20 can, for example, have an external dimension having a width W of approximately 180 cm, a length L of approximately 250 cm, and a height H of approximately 200 cm.

A storage space 26 for storing aircraft wheels 51 is provided, for example, within the frame structure 20. Four aircraft wheels 51 can be temporarily stored within the frame structure 20 in the shown example. An equipment chamber or a tool cabinet 27 is also provided within the frame structure 20 in which equipment 3 can be stored.

A fastening device 29 (which is not shown in greater detail) is provided on a lateral wall 23 of the frame structure 20, in particular on an end wall, to which fastening device a mobile lift truck 31 can be temporarily fixed. The fastening device 29 in the present case comprises two receiving shafts which are oriented in the longitudinal extension of the container 21, into each of which a fork of the mobile lift truck 31 can be inserted, the mobile lift truck 31 being fixable within the receiving shafts by bracing the forks, as is shown, for example, in FIGS. 6, 7 and 11.

The equipment 3 in particular comprise tools 30, aids such as a mobile lift truck 31 and/or a fire extinguisher, operating resources, spare parts such as spare aircraft wheels 51, and the like.

The mobile lift truck 31, which is here designed as a manual lift truck, is in particular used in the embodiment of the maintenance and repair unit 2a, 2b, 2c according to FIGS. 1 to 11 for transporting an aircraft wheel 51 from a frame structure 20 to a landing gear (which is not shown in greater detail) of an aircraft 5, or from an aircraft 5 to the frame structure 20. The mobile lift truck 31 has a lifting device 32 arranged on a lifting mast for raising or lowering the aircraft wheel 51 located on the mobile lift truck 31 for this purpose. As an alternative to the mobile lift truck 31 or in addition thereto, a carrying arm 40 can be provided on the frame structure 20.

Figure 12:
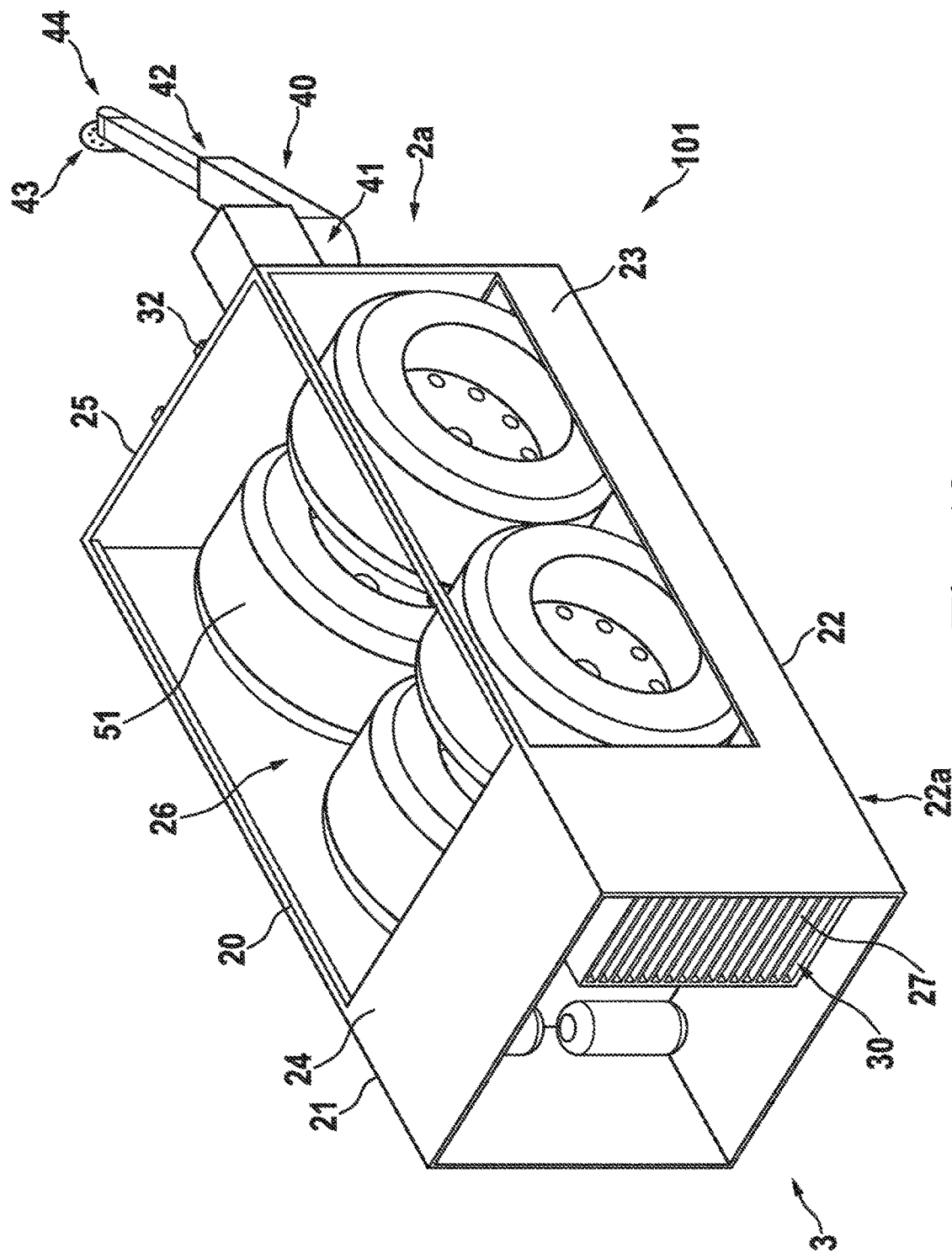
FIG. 12 shows a maintenance and repair unit having a carrying arm.

The carrying arm 40 can be arranged on the frame structure 20 as shown, for example, in FIG. 12, and is used to raise and move an aircraft wheel 51. The carrying arm 40 is in this case mounted via a swivel joint 41 so as to be pivotable with respect to the frame structure 20 and is designed to be telescopically extendable in the longitudinal extension thereof via an extension mechanism 42. A device 43 (which is not shown in greater detail) for temporarily fixing an aircraft wheel 51 to the carrying arm 40 is arranged at the free end 44 of the carrying arm 40, for example, in the form of a wheel mount 43.

The transport vehicle 1 is in the present example designed as a low-floor lifting vehicle via which the frame structure 20 can be raised, lowered, and transported in a permanently almost horizontal position. The lifting device 10, which is arranged in a receiving region 11 of the transport vehicle 1 and which allows the frame structure 20 to be raised, lowered and held between a first load wheel 14 and a second load wheel 15, is used for this purpose. The receiving region 11 is surrounded by three faces of the vehicle 1; in particular, the vehicle, which appears U-shaped from above in a plan view, can laterally surround the frame structure 20 with the open part of the "U", the so-called receiving region 11.

The first load wheel 14 in the present example is arranged on the left-hand side in the main direction of travel of the transport vehicle 1 and the second load wheel 15 is arranged on the right-hand side, as is shown, for example, in FIG. 7. Above the first load wheel 14 and the second load wheel 15, the transport vehicle 1 has an additional loading area 12, 13 in each case, on each of which a compressed air tank 33 can be transported. The compressed air tank 33 is used, for example, during maintenance work, in particular when replacing a wheel, for raising or supporting the aircraft 5, in particular the nose landing gear or one of the main landing gears.

For a wheel change on an aircraft 5, the maintenance and repair unit 2a, as shown in FIGS. 5 and 6, is transported to the relevant aircraft 5 via the transport vehicle 1. Once it has arrived at the aircraft 5, the maintenance and repair unit 2a, in particular the frame structure 20, is lowered onto the floor 6 via the lifting device 10.

After the frame structure 20 has been set down, the mobile lift truck 31 can be removed from the fastening device 29 and used. The transport vehicle 1 can at the same time move forward without the maintenance and repair unit 2a, thus leaving the receiving region 11 free.

At least one of the compressed air tanks 33 stored in the loading areas 12, 13 is then removed via the mobile lift truck 31 and brought to the landing gear to be processed. The transport vehicle 1 can now, for example, drive back to the equipment store 7 in order to receive another maintenance and repair unit 2b, 2c.

In the next steps, the wheel replacement can take place, in particular raising the aircraft 5 or the relevant landing gear using the compressed air from the compressed air tank 33, releasing an aircraft wheel 51, bringing the aircraft wheel 51 to the frame structure 20, and bringing a spare aircraft wheel 51 from the frame structure 20 to the landing gear, mounting the spare aircraft wheel 51, and setting the aircraft 5 back down on the floor 6. The loading and unloading of the aircraft wheels 51 into and out of the frame structure 20 can in this case take place via the mobile lift truck 31 or a carrying arm 40.

After the work has been completed, the maintenance and repair unit 2a, which has been prepared again for transport, can be picked up by the transport vehicle 1 by being raised into the receiving region 11 via the lifting device 10, and carried by the transport vehicle 1.

It should be clear that the scope of protection of the present invention is not limited to the embodiments described. The design of the maintenance and repair unit and of the transport vehicle can in particular be modified without changing the core of present the invention. Reference should also be had to the appended claims.

LIST OF REFERENCE SIGNS

1 Transport vehicle
2a Maintenance and repair unit
2b Maintenance and repair unit
2c Maintenance and repair unit
3 Equipment
4 Airport
5 Aircraft
6 Floor/Subfloor/Apron
7 Equipment store/Workshop/Hangar 10 Lifting device
11 Receiving region
12 Loading area
13 Loading area
14 First load wheel
15 Second load wheel
20 Frame structure
21 Container
22 Bottom
22a Lower face
23 Wall/Lateral wall
24 Ceiling
25 Door
26 Storage space
27 Equipment chamber/Tool cabinet
29 Fastening device
30 Tools
31 Mobile lift truck
32 Lifting device
33 Compressed air tank
40 Carrying arm
41 Swivel joint
42 Extension mechanism
43 Wheel mount
44 Free end
51 Aircraft wheel/Spare aircraft wheel
100 System
101 Ready state
W Width
H Height
L Length

What is claimed is:

1. A system for providing maintenance and repair units for maintenance work on an aircraft, the system comprising:
at least one maintenance and repair unit which comprises at least one frame structure which is configured to carry equipment and to be transportable, the at least one frame structure being provided as an at least partially closed container which comprises at least one of a bottom, walls and a ceiling; and
at least one transport vehicle which comprises a lifting device which is configured to raise, to set down, and to transport the at least one maintenance and repair unit, wherein,
in a ready state, a lower face of the bottom of the at least one frame structure rests on a floor.

2. The system as recited in claim 1, wherein the maintenance work on the aircraft is a replacement of aircraft wheels.

3. The system as recited in claim 1, wherein the ready state is where the frame structure is not raised by the transport.

4. The system as recited in claim 1, wherein the floor is an airport apron floor.

5. The system as recited in claim 1, wherein the at least one frame structure further comprises,
a storage space for at least one aircraft wheel, and
at least one equipment chamber for storing the equipment.

6. The system as recited in claim 1, wherein the at least one frame structure has an external dimension having a width of approximately 180 cm, a length of approximately 250 cm, and a height of approximately 200 cm.

7. The system as recited in claim 1, wherein the at least one maintenance and repair unit comprises a mobile lift truck which is suitable for transporting aircraft wheels.

8. The system as recited in claim 7, wherein,
the at least one frame structure comprises a lateral wall on which is arranged a fastening device, and
the fastening device is configured so that the mobile lift truck can be at least temporarily fixed thereto.

9. The system as recited in claim 1, wherein,
the at least one frame structure comprises a carrying arm arranged thereon, and
the carrying arm is configured to raise and to move an aircraft wheel.

10. The system as recited in claim 1, wherein,
the at least one transport vehicle is designed as a low-floor lifting vehicle which comprises a first load wheel and a second load wheel between which the at least one maintenance and repair unit is arranged, and
the lifting device is further configured to raise the at least one maintenance and repair unit so that the at least one maintenance and repair unit is substantially horizontally.

11. The system as recited in claim 1, wherein the at least one transport vehicle further comprises at least one additional loading area on which at least one compressed air tank is transportable.

12. A method for providing maintenance and repair units which are decentralized for maintenance work on an aircraft using the system as recited in claim 1, the method comprising:
equipping at least one maintenance and repair unit with equipment in a central equipment store;
receiving a first maintenance and repair unit via the at least one transport vehicle;
transporting the first maintenance and repair unit from the central equipment store to a first aircraft; and
setting down the first maintenance and repair unit from the at least one transport vehicle.

13. The method as recited in claim 12, wherein,
the maintenance work on the aircraft is the replacement of aircraft wheels,
the central equipment store is located on an airport site,
the receiving of the first maintenance and repair unit via the at least one transport vehicle is performed by raising the first maintenance and repair unit via the lifting device, and
the setting down of the first maintenance and repair unit from the at least one transport vehicle is performed in a region which is at least one of next to and below a first aircraft.

14. The method as recited in claim 12, wherein, after the setting down of the first maintenance and repair unit from the at least one transport vehicle, the method further comprises:
receiving a second maintenance and repair unit;
transporting the second maintenance and repair unit from the central equipment store to a second aircraft; and
setting down the second maintenance and repair unit in a region of the second aircraft.

15. The method as recited in claim 14, wherein, after the setting down of first maintenance and repair unit or of the second maintenance and repair unit, the method further comprises:
moving a carrying arm which is arranged on the at least one frame structure so that, during a replacement of an aircraft wheel, a first aircraft wheel which is removed from the first aircraft or from the second aircraft, as the case might be, is moved by via the carrying arm in a direction of the first maintenance and repair unit or of the second maintenance and repair unit, as the case might be.

16. The method as recited in claim 15, further comprising:
moving a second aircraft wheel from the first maintenance and repair unit or from the second maintenance and repair unit, as the case might be, to a wheel mount of the first aircraft or of the second aircraft, as the case might be.

\* \* \* \* \*

UNITED STATES PATENT AND TRADEMARK OFFICE
CERTIFICATE OF CORRECTION

| | |
|---|---|
| PATENT NO. | : 11,897,633 B2 |
| APPLICATION NO. | : 17/620749 |
| DATED | : February 13, 2024 |
| INVENTOR(S) | : Alfred Schuetz, Pascal Schuetz and Juergen Keller |

It is certified that error appears in the above-identified patent and that said Letters Patent is hereby corrected as shown below:

In the Claims

In Claim 3, Column 9, Line 54, "transport." should read --transport vehicle.--

In Claim 10, Column 10, Line 18, "tally." should read --tal.--.

Signed and Sealed this
Sixteenth Day of April, 2024

Katherine Kelly Vidal
*Director of the United States Patent and Trademark Office*